(12) United States Patent
Lee

(10) Patent No.: US 11,823,570 B2
(45) Date of Patent: Nov. 21, 2023

(54) TRAFFIC MANAGEMENT SERVER, AND METHOD AND COMPUTER PROGRAM FOR TRAFFIC MANAGEMENT USING THE SAME

(71) Applicants: BITSENSING INC., Seoul (KR); Jae Eun Lee, Seoul (KR)

(72) Inventor: Jae Eun Lee, Seoul (KR)

(73) Assignees: BITSENSING INC., Seoul (KR); Jae Eun Lee, Seoul (KR)

( * ) Notice: Subject to any disclaimer, the term of this patent is extended or adjusted under 35 U.S.C. 154(b) by 424 days.

(21) Appl. No.: 17/338,983

(22) Filed: Jun. 4, 2021

(65) Prior Publication Data

US 2021/0295685 A1 Sep. 23, 2021

Related U.S. Application Data

(63) Continuation of application No. PCT/KR2019/013193, filed on Oct. 8, 2019.

(30) Foreign Application Priority Data

Dec. 6, 2018 (KR) .................. 10-2018-0156308

(51) Int. Cl.
*G01S 13/91* (2006.01)
*G08G 1/052* (2006.01)
*G08G 1/01* (2006.01)

(52) U.S. Cl.
CPC .............. *G08G 1/052* (2013.01); *G01S 13/91* (2013.01); *G08G 1/0112* (2013.01); *G08G 1/0125* (2013.01)

(58) Field of Classification Search
CPC .... G08G 1/052; G08G 1/0112; G08G 1/0125; G01S 13/91
See application file for complete search history.

(56) References Cited

FOREIGN PATENT DOCUMENTS

| JP | 2010102575 A | 5/2010 |
|---|---|---|
| JP | 2015022698 A | 2/2015 |
| JP | 2016057066 A | 4/2016 |
| KR | 100496490 B1 | 6/2005 |
| KR | 101239873 B1 | 3/2013 |
| KR | 1020170012300 A | 2/2017 |
| KR | 1020180106417 A | 10/2018 |

OTHER PUBLICATIONS

International Search Report and Written Opinion dated Jan. 21, 2020 for PCT/KR2019/013193 (4 pages).

*Primary Examiner* — Mathew Franklin Gordon
(74) *Attorney, Agent, or Firm* — Dinsmore & Shohl LLP; Yongsok Choi, Esq.

(57) ABSTRACT

A traffic management server includes a receiver configured to receive radar detection results from radars attached to a plurality of vehicles, a road boundary detection unit configured to detect road boundary information from the received radar detection results, a lane information detection unit configured to detect lane information, indicating which lane the plurality of vehicles is located in, based on the detected road boundary information and predetermined lane width information, a classification unit configured to classify the received radar detection results by using the detected lane information and a calculation unit configured to calculate vehicle speed information for each lane by using the classified radar detection results.

18 Claims, 5 Drawing Sheets

TRAFFIC MANAGEMENT SERVER, AND METHOD AND COMPUTER PROGRAM FOR TRAFFIC MANAGEMENT USING THE SAME

CROSS-REFERENCE TO RELATED APPLICATIONS

This application is a continuation of International Application No. PCT/KR2019/013193 filed on Oct. 8, 2019, which claims priority to Korean Patent Application No. 10-2018-0156308 filed on Dec. 6, 2018, the entire contents of which are herein incorporated by reference.

TECHNICAL FIELD

The present disclosure relates to a traffic management server, and a method and a computer program for traffic management using the same.

BACKGROUND

The development of industry and economy can lead to an increase in social, economic and cultural activities, which can increase the number of vehicles and the demand for passenger and cargo traffic between regions and also change the mode of traffic in various ways. However, in most cases, the expansion of road capacity and the diversification of roads cannot sufficiently respond to the increase in traffic demand and the various changes in mode, which results in an increase in public dissatisfaction and a continuous increase in economic losses caused by air pollution, traffic accidents, and traffic delays.

In this situation, a new alternative is proposed to economically narrow the gap between traffic demand and road supply by significantly improving the efficiency of road use by using technologies in other fields such as electronics, information, and communication.

In recent years, this method has been referred to as "Intelligent Transport System (ITS)", and by using these technologies, overall improvements are expected in traffic control, traffic information guidance, vehicle operation, and public and cargo traffic.

Meanwhile, in case of an accident or traffic jam in the road in the past, an investigator visited the road site to examine the daily, weekly or monthly traffic volume, average speed, and the types of vehicles, and then investigated the accident, controlled traffic flow and determined to build a new road and expand the road based on the examined data. However, in recent years, an automatic vehicle classification (AVC) system developed and distributed to measure the number of vehicles passing by hour and lane has been installed at the site.

As a prior art document that proposes a stereoscopic video system for traffic monitoring and security, reference can be made to Korean Patent No. 10-1239873.

The above document discloses a method for monitoring situations at various distances in three dimensions by using omni-directional cameras and surveillance cameras installed at various distances, monitoring traffic conditions in three dimensional by blocking a road traffic network starting from signal apparatuses each equipped with a video control device at various distances, and enhancing the security effect by attaching a push button switch and a warning light to each structure equipped with a surveillance camera.

With regard to a method and a system for automatically detecting a traffic accident at an intersection and distinguishing between an attacker and a victim, reference can be made to Korean Patent No. 10-0496490.

The above document provides a technique capable of image processing, such as video compression, storage, transmission, playback, mix, mux, inquiry, etc., and automatically recognizing images of accidents when remotely controlling a signal controller or obtaining information of a vehicle that violates speed limits and signals by using surveillance cameras.

However, the above-described prior art documents have limitations in accurately determining road conditions in real time with black box images at the time of a vehicle accident or determining traffic flow conditions on branch roads.

PRIOR ART DOCUMENT (Patent Document 1) Korean Patent No. 10-1239873
(Patent Document 2) Korean Patent No. 10-0496490

SUMMARY

Problems to be Solved by the Invention

The present disclosure is provided to solve the above-described problems of the prior art, and provides a traffic management server that detects road boundary information of, for example, center line or guardrail, by using a radar attached to a vehicle, determines which lane the vehicle is located in, on the basis of the detected road boundary information and lane width information of a corresponding road, calculates vehicle speed information for each lane and supplies the calculated vehicle speed information for each lane to a driver device to induce uniform distribution of a plurality of vehicles to a plurality of lanes and suppress a traffic jam, and a method and a computer program for traffic management using the same.

However, the problems to be solved by the present disclosure are not limited to the above-described problems. There may be other problems to be solved by the present disclosure.

Means for Solving the Problems

According to at least one example embodiment, a traffic management server may include a receiver configured to receive radar detection results from radars attached to a plurality of vehicles; a road boundary detection unit configured to detect road boundary information from the received radar detection results; a lane information detection unit configured to detect lane information, indicating which lane the plurality of vehicles is located in, based on the detected road boundary information and predetermined lane width information; a classification unit configured to classify the received radar detection results by using the detected lane information; and a calculation unit configured to calculate vehicle speed information for each lane by using the classified radar detection results.

According to at least one other example embodiment, a method for traffic management may include receiving radar detection results from radars attached to a plurality of vehicles; detecting road boundary information from the received radar detection results; detecting lane information, indicating which lane the plurality of vehicles is located in, based on the detected road boundary information and predetermined lane width information; classifying the received radar detection results by using the detected lane information; and calculating vehicle speed information for each lane by using the classified radar detection results.

According to at least one other example embodiment, a computer program stored in a medium including a sequence of instructions for traffic management that, when executed by a computing device, causes the computing device to: receive radar detection results from radars attached to a plurality of vehicles; detect road boundary information from the received radar detection results; detect lane information, indicating which lane the plurality of vehicles is located in, based on the detected road boundary information and predetermined lane width information; classify the received radar detection results by using the detected lane information; and calculate vehicle speed information for each lane by using the classified radar detection results.

This summary is provided by way of illustration only and should not be construed as limiting in any manner. Besides the above-described exemplary embodiments, there may be additional exemplary embodiments that become apparent by reference to the drawings and the detailed description that follows.

Effects of the Invention

According to any one the means for solving the problems of the present disclosure, the present disclosure provides a traffic management server that detects road boundary information of, for example, center line or guardrail, by using a radar attached to a vehicle, determines which lane the vehicle is located in, on the basis of the detected road boundary information and lane width information of a corresponding road, calculates vehicle speed information for each lane and supplies the calculated vehicle speed information for each lane to a driver device to induce uniform distribution of a plurality of vehicles to a plurality of lanes and suppress a traffic jam, and a method and a computer program for traffic management using the same.

Further, the present disclosure provides a traffic management server that calculates vehicle speed information for each lane to estimate which lane an accident occurs in at the time of an accident in the road and supplies the estimated information to a driver device to suppress a double-collision vehicle accident at the time of the accident and effectively suppress a traffic jam caused by the accident, and a method and a computer program for traffic management using the same.

Furthermore, the present disclosure provides a traffic management server that estimates the likelihood of an accident based on radar detection results and a driver's actual vehicle speed information compared to calculated vehicle speed information for each lane and supplies warning information to the driver depending on the estimated likelihood of an accident to enable the driver to recognize speeding or dangerous situation and drive safely, and a method and a computer program for traffic management using the same.

DETAILED DESCRIPTION

Figure 1:
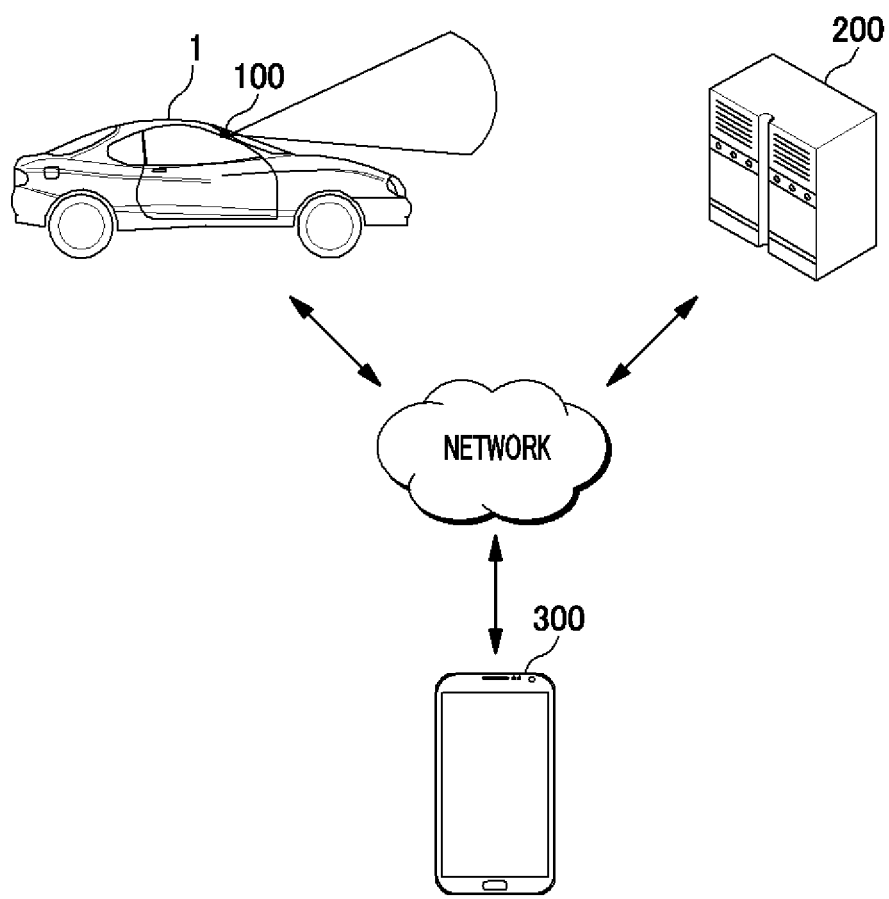
FIG. 1 is a diagram showing the configuration of a traffic management system according to an embodiment of the present disclosure.

Hereafter, example embodiments will be described in detail with reference to the accompanying drawings so that the present disclosure may be readily implemented by those skilled in the art. However, it is to be noted that the present disclosure is not limited to the example embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected" another element and an element being "electronically connected" to another element via another element. Further, it is to be understood that the terms "comprises," "includes," "comprising," and/or "including" means that one or more other components, steps, operations, and/or elements are not excluded from the described and recited systems, devices, apparatuses, and methods unless context dictates otherwise; and is not intended to preclude the possibility that one or more other components, steps, operations, parts, or combinations thereof may exist or may be added.

Throughout this document, the term "unit" may refer to a unit implemented by hardware, software, and/or a combination thereof. As examples only, one unit may be implemented by two or more pieces of hardware or two or more units may be implemented by one piece of hardware.

Throughout this document, a part of an operation or function described as being carried out by a terminal or device may be implemented or executed by a server connected to the terminal or device. Likewise, a part of an operation or function described as being implemented or executed by a server may be so implemented or executed by a terminal or device connected to the server.

Hereinafter, embodiments of the present disclosure will be explained in detail with reference to the accompanying drawings.

FIG. 1 is a diagram showing the configuration of a traffic management system according to an embodiment of the present disclosure.

Referring to FIG. 1, a traffic management system 10 may include a radar 100, a traffic management server 200 and a user device 300.

The components of the traffic management system 10 illustrated in FIG. 1 are typically connected to each other via a network. For example, as illustrated in FIG. 1, the radar 100, the traffic management server 200 and the user device 300 may be connected to each other simultaneously or sequentially.

The network refers to a connection structure that enables information exchange between nodes such as devices and servers, and includes LAN (Local Area Network), WAN (Wide Area Network), Internet (WWW: World Wide Web), a wired or wireless data communication network, a telecommunication network, a wired or wireless television network and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi and the like, but may not be limited thereto.

The radar 100 may be installed in a vehicle 1. For example, if the radar 100 is an aftermarket radar, it may be installed inside a front windshield of the vehicle. In this case, the radar 100 may be attached to the front windshield, like a dash cam, to face the front by using a suction plate, a sticker, adhesive, etc., or may be installed to be fixed to a room mirror, or may be installed on a dashboard by using an adhesive tool, a suction plate or a holder with a weight such as a sandbag. The radar 100 can detect vehicles and objects in a front detection area, warn of a collision, a dangerous situation or the like (with, for example, sound, light, etc.), and transmit a radar detection result to the server 200.

As another example, if the radar 100 is a radar to be installed in a new vehicle, it may be installed on a grille or a bumper at the front of the vehicle. In this case, the radar 100 can be installed in the same manner as the aftermarket radar.

The radar 100 may detect an object located in the detection area of the radar 100 and transmit a radar detection result to the traffic management server 200 to be described later. Here, the radar 100 may also be attached to the side and the rear of the vehicle 1 in addition to the front of the vehicle 1. In this case, the detection area of the radar may be extended.

The radar 100 may further include a GPS module (not shown) for measuring location information and may transmit the location information of the vehicle 1 measured by the GPS module (not shown) to the traffic management server 200 to be described later.

Also, the radar 100 may be equipped with a camera. In this case, a lane can be recognized by analyzing images taken by the camera, and, thus, it is possible to immediately estimate information of the lane in which the vehicle with the radar is running. For this reason, the lane can be estimated more quickly than when the lane is estimated by the radar alone. According to the present disclosure, the locations, speeds and the like of surrounding vehicles detected by the radar based on the lane information estimated by the camera can be transmitted to the traffic management server 200, and the traffic management server 200 can estimate the traffic volume and traffic flow for each lane.

The traffic management server 200 may receive the radar detection result from the radar 100 and detect road boundary information from the received radar detection result.

Further, the traffic management server 200 may receive location information from the radar 100 and detect lane information, indicating which lane the plurality of vehicles is located in, based on the detected road boundary information and predetermined lane width information corresponding to the received location information.

Here, the traffic management server 200 may map the received radar detection result and location information based on an identifier of the radar 100 that has transmitted the radar detection result and the location information. That is, the traffic management server 200 may manage a radar detection result from each radar 100.

Also, the traffic management server 200 may classify the received radar detection result by using the detected lane information and calculate vehicle speed information for each lane by using the classified radar detection result.

The user device 300 may receive the calculated vehicle speed information for each lane from the traffic management server 200. Here, the user device 300 may be implemented as a tablet, a smart phone, a PC or the like that supports a network.

Hereinafter, a radar according to an embodiment of the present disclosure will be described in more detail with reference to FIG. 2.

Figure 2:
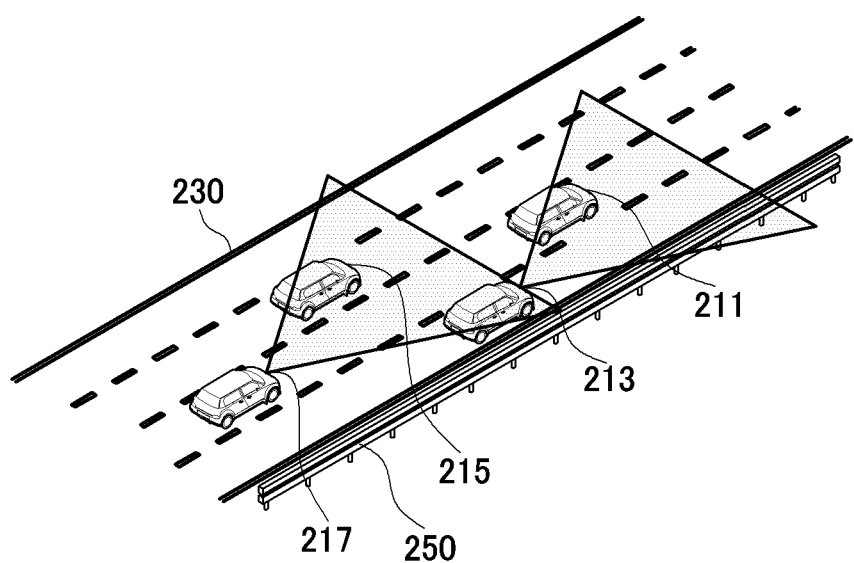
FIG. 2 is a diagram for explaining a radar that detects an object according to an embodiment of the present disclosure.

FIG. 2 is a diagram for explaining a radar that detects an object according to an embodiment of the present disclosure.

Referring to FIG. 2, a plurality of radars 211 to 217 installed in a plurality of vehicles, respectively, may detect an object at the respective locations.

Here, as shown in FIG. 2, the plurality of radars 211 to 217 can detect a vehicle located in a detection area as an object. Also, if a median strip 230 and a guardrail 250 are located in the detection area, the plurality of radars 211 to 217 may detect the median strip 230 and the guardrail 250 as objects.

Here, the plurality of radars 211 to 217 may also transmit the detected radar detection results to the traffic management server 200 to be described later. The radar detection results may include at least one of radius information, angle information, and speed information of an object detected by signals transmitted from the radars. The radar detection results may also include x, y coordinate values converted from the radius information, angle information, and speed of the detected object.

That is, the plurality of radars 211 to 217 installed in the plurality of vehicles, respectively, can detect radius information, angle information, and speed information of an object in the detection area at the respective locations, and when any one or more of the radius information, angle information, and speed of the object detected by any one or more of the plurality of radars 211 to 217 changes by a threshold amount or more within a predetermined period of time, the traffic management server 200 may estimate the occurrence of an accident based on this change.

Hereinafter, a traffic management server according to an embodiment of the present disclosure will be described in more detail with reference to FIG. 3.

Figure 3:
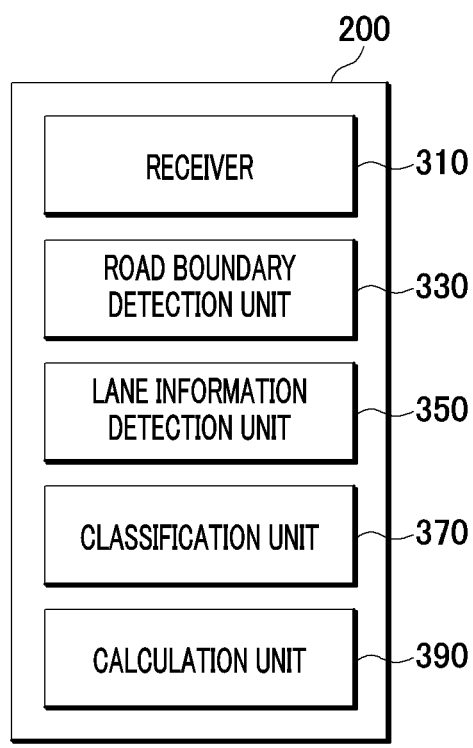
FIG. 3 is a diagram showing the configuration of a traffic management server according to an embodiment of the present disclosure.

FIG. 3 is a diagram showing the configuration of the traffic management server 200 according to an embodiment of the present disclosure.

Referring to FIG. 3, the traffic management server 200 may include a receiver 310, a road boundary detection unit 330, a lane information detection unit 350, a classification unit 370 and a calculation unit 390.

The receiver 310 may receive radar detection results from radars attached to a plurality of vehicles, respectively.

Also, the receiver 310 may receive location information mapped with the radar detection results based on the mapped radar identifiers.

The road boundary detection unit 330 may detect road boundary information from the received radar detection results.

More specifically, referring to FIG. 2, the road boundary detection unit 330 may group the radar detection results (radius information, angle information, and speed) for an object detected by the plurality of radars 211 to 217. When the road boundary detection unit 330 groups the radar detection results for each detected object, if the result values form a straight line or a curve, the road boundary detection unit 330 may estimate the object as the median strip 230 and the guardrail 250 and detect road boundary information. That is, the road boundary information may include straight line value or curve line value corresponding to at least one of the median strip 230 or the guardrail 250 detected by the plurality of radars 211 to 217.

However, when the road boundary detection unit 330 groups the radar detection results (radius information, angle information, speed) for an object detected by the plurality of radars 211 to 217, if the detection value does not form a straight line or a curve, the road boundary detection unit 330 may estimate the number of left and right lanes covered by at least one of the plurality of radars 211 to 217 based on the radar detection results and may also estimate a lane in which a vehicle with the radar is running based on predetermined lane width information corresponding to location information received from the radar. Also, based on this estimation, the road boundary detection unit 330 may estimate the median strip 230 and the guardrail 250 and detect road boundary information.

Here, the lane width information may be set based on road construction information and road specifications information stored in a central server (not shown) including a road traffic authority server (not shown), but is not limited thereto.

Referring back to FIG. 3, the lane information detection unit 350 may detect lane information, indicating which lane the plurality of vehicles is located in, based on the detected road boundary information and the predetermined lane width information.

More specifically, the lane information detection unit 350 may detect information of the lane in which the radar 100 is located based on the distance between the radar 100 and an object detected by the radar 100. For example, the lane information detection unit 350 may detect horizontal distances from the detected road boundary information to each of the plurality of vehicles and compare the lane width information with the horizontal distances to detect location information of each vehicle.

Further, when the receiver 310 receives radar detection results from a plurality of radars 100, the lane information detection unit 350 may combine the received radar detection results to drive information of the lanes in which the plurality of radars 100 is respectively located.

Furthermore, the lane information detection unit 350 may detect local information of the road in which each vehicle is currently located (for example, information of the distance between lanes in the corresponding road) by using the location information (for example, GPS information) of each vehicle and amend and correct the previously detected lane information by using the detected local information of the road. In this case, the location information of each vehicle may be identical to location information of a radar installed in each vehicle.

The classification unit 370 may classify the received radar detection results by using the detected lane information. For example, the classification unit 370 may classify the radar detection results for lane based on the detected lane information. More specifically, when radar detection results are received from the radars 100 attached to a plurality of vehicles located in different regions, respectively, the classification unit 370 may classify the radar detection results for lane based on location information of the vehicles mapped with the radar detection results, respectively.

The calculation unit 390 may calculate vehicle speed information for each lane by using the classified radar detection results.

For example, the calculation unit 390 may detect a speed of each vehicle by using a radar detection result corresponding to a vehicle in front of each vehicle from among the radar detection results classified for lane, and calculate vehicle speed information for each lane by using the speed of each vehicle located in each road.

Also, the calculation unit 390 may calculate average speed information for each location information by using the vehicle speed information for each lane which includes the same location information. Moreover, the calculation unit 390 may detect accident information for each lane by comparing the calculated average speed information and the calculated vehicle speed information for each lane. For example, the calculation unit 390 may estimate the occurrence of an accident based on the calculated vehicle speed information for each lane that changes from the average speed information by a threshold amount or more within a predetermined period of time and detect accident information for each lane based on the estimation result.

Further, the calculation unit 390 may calculate an average speed for each major section (for example, a junction) of a specific road by using the radar detection results classified for lane. In this case, the calculation unit 390 may estimate an accident section by detecting a sudden change in an average speed in a specific section. The calculation unit 390 may supply bypass information related to the estimated accident section, or may automatically make an emergency call.

Furthermore, the calculation unit 390 may detect the number of vehicles equipped with radars in a specific road and density information, indicating how dense the vehicles are in the specific road, from the collected radar detection results. Thus, according to the present disclosure, it is possible to estimate and supply the accuracy of traffic flow data (for example, vehicle speed information for each lane and accident information for each lane).

Meanwhile, the traffic management server 200 may supply the detected accident information for each lane to the user device 300, and may also supply bypass information and warning information to the user device 300 based on the accident information for each lane.

That is, the traffic management server 200 according to an embodiment of the present disclosure can supply the user device 300 with bypass information and warning information as well as accident information for each lane, and, thus, it is possible to suppress a traffic jam caused by a traffic accident and effectively suppress a double-collision vehicle accident which may occur when a driver is not aware of the occurrence of a traffic accident. Further, vehicle speed information for each lane detected according to the present disclosure may be supplied for navigation service, and may be used for autonomous driving control of a vehicle.

Figure 4:
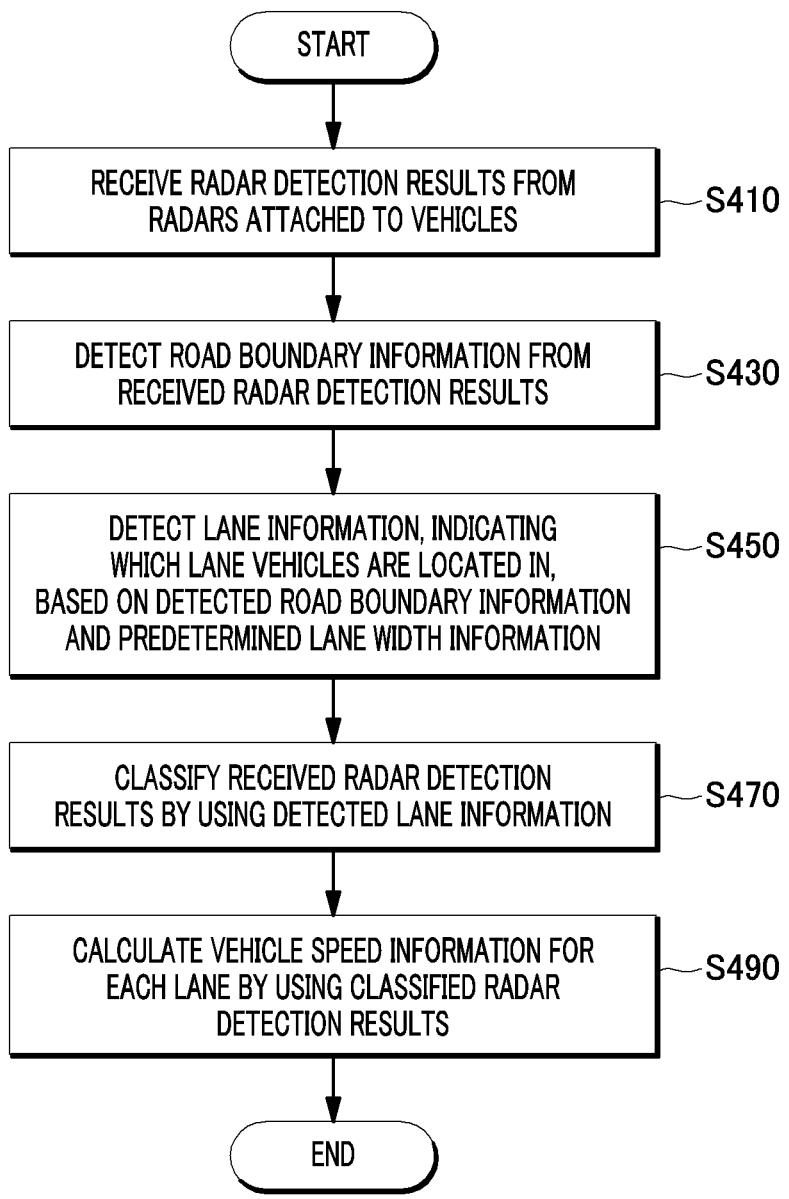
FIG. 4 shows a method for traffic management using a traffic management server according to an embodiment of the present disclosure.

FIG. 4 shows a method for traffic management using a traffic management server according to an embodiment of the present disclosure. The method for traffic management using a traffic management server illustrated in FIG. 4 includes the processes time-sequentially performed according to the embodiment illustrated in FIG. 1 to FIG. 3. Therefore, the descriptions of the processes may also be applied to the method for traffic management using a traffic management server according to the embodiment illustrated in FIG. 1 to FIG. 3, even though they are omitted hereinafter.

Referring to FIG. 4, in a process S410, the traffic management server 200 may receive radar detection results from radars attached to a plurality of vehicles, respectively.

In a process S430, the traffic management server 200 may detect road boundary information from the received radar detection results.

In a process S450, the traffic management server 200 may detect lane information, indicating which lane the plurality of vehicles is located in, based on the detected road boundary information and predetermined lane width information.

In a process S470, the traffic management server 200 may classify the received radar detection results by using the detected lane information.

In a process S490, the traffic management server 200 may calculate vehicle speed information for each lane by using the classified radar detection results.

In the descriptions above, the processes S410 to S490 may be divided into additional processes or combined into fewer processes depending on an embodiment. In addition, some of the processes may be omitted and the sequence of the processes may be changed if necessary.

Figure 5:
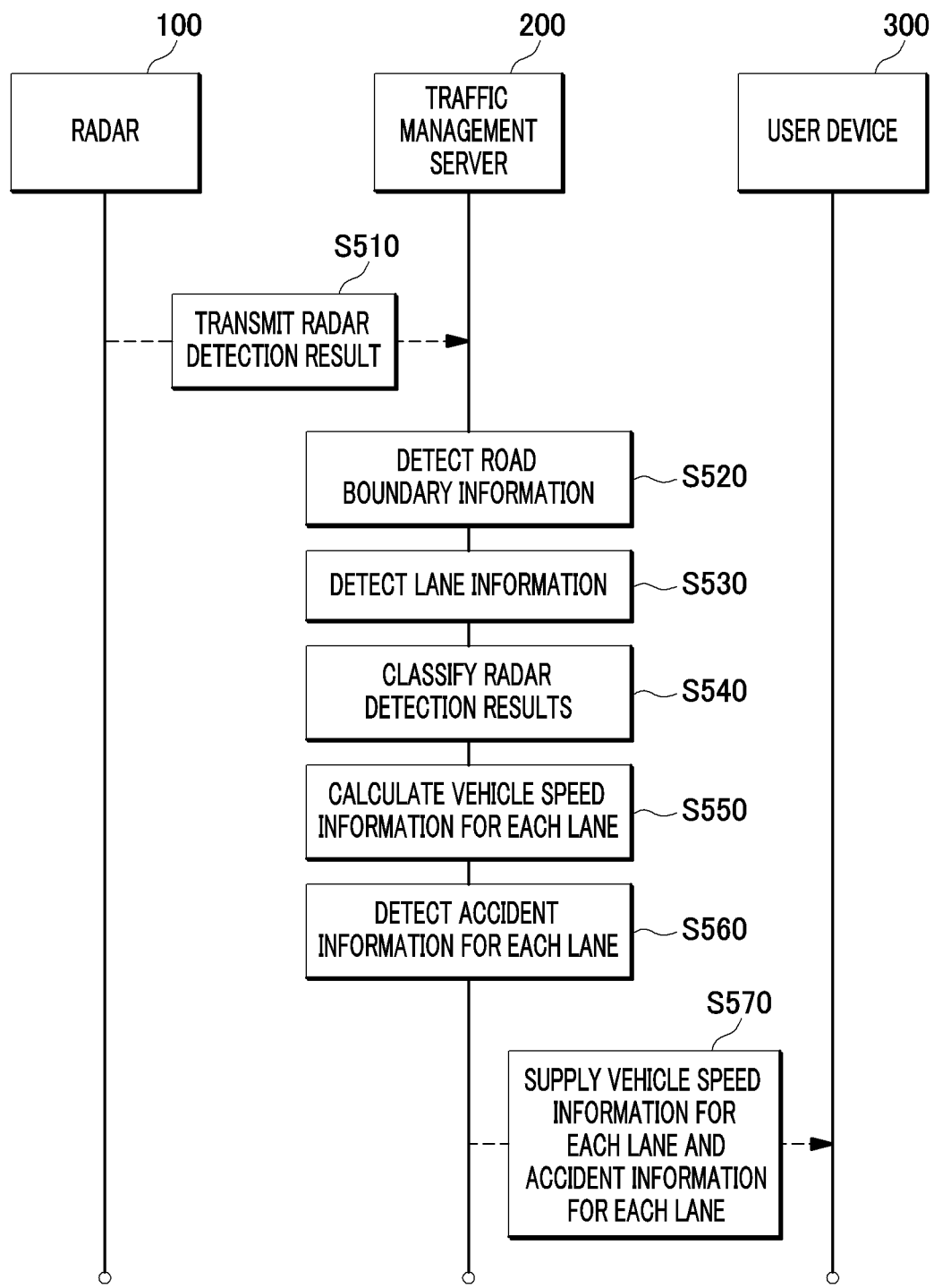
FIG. 5 shows a method for traffic management by a traffic management system according to an embodiment of the present disclosure.

FIG. 5 shows a method for traffic management by a traffic management system according to an embodiment of the present disclosure. The method for traffic management by a traffic management system illustrated in FIG. 5 includes the processes time-sequentially performed according to the embodiment illustrated in FIG. 1 to FIG. 3. Therefore, the descriptions of the processes may also be applied to the method for traffic management using a traffic management server according to the embodiment illustrated in FIG. 1 to FIG. 3, even though they are omitted hereinafter.

Referring to FIG. 5, in a process S510, the radar 100 installed in each vehicle may detect an object located around the vehicle and transmit the radar detection result for the object to the traffic management server 200.

In a process S520, the traffic management server 200 may receive radar detection results from the radars 100 attached to a plurality of vehicles, respectively, and detect road boundary information from the received radar detection results.

In a process S530, the traffic management server 200 may detect lane information, indicating which lane the plurality of vehicles is located in, based on the detected road boundary information and predetermined lane width information.

In a process S540, the traffic management server 200 may classify the received radar detection results by using the detected lane information.

In a process S550, the traffic management server 200 may calculate vehicle speed information for each lane by using the classified radar detection results.

In a process S560, the traffic management server 200 may calculate average speed information for each lane by using the vehicle speed information for each lane which includes the same location information, and may detect accident information for each lane by comparing the calculated average speed information for each lane and the calculated vehicle speed information for each lane.

In a process S570, the traffic management server 200 may transmit the vehicle speed information for each lane and the accident information for each lane to the user device 300.

In the descriptions above, the processes S510 to S570 may be divided into additional processes or combined into fewer processes depending on an embodiment. In addition, some of the processes may be omitted and the sequence of the processes may be changed if necessary.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A traffic management server, comprising:
a receiver configured to receive radar detection results from radars attached to a plurality of vehicles;
a road boundary detection unit configured to detect road boundary information from the received radar detection results;
a lane information detection unit configured to detect lane information, indicating which lane the plurality of vehicles is located in, based on the detected road boundary information and predetermined lane width information;
a classification unit configured to classify the received radar detection results by using the detected lane information; and
a calculation unit configured to calculate vehicle speed information for each lane by using the classified radar detection results.

2. The traffic management server of claim 1,
wherein the radar detection results include at least one of radius information, angle information, and speed information of an object detected by signals transmitted from the radars.

3. The traffic management server of claim 1,
wherein the road boundary information includes straight line value or curve line value corresponding to at least one of a median strip or a guardrail detected by the radars.

4. The traffic management server of claim 1,
wherein the lane information detection unit detects horizontal distances from the detected road boundary information to each of the plurality of vehicles and compares the lane width information with the horizontal distances to detect location information of each vehicle.

5. The traffic management server of claim 1,
wherein the receiver further receives location information of the vehicles mapped with the radar detection results, respectively.

6. The traffic management server of claim 5,
wherein the classification unit classifies the received radar detection results for each lane by using the location information of the vehicles and the vehicle speed information for each lane.

7. The traffic management server of claim 1,
wherein the calculation unit detects a speed of each vehicle by using a radar detection result corresponding to a vehicle in front of each vehicle from among the radar detection results classified for each lane, and calculates the vehicle speed information for each lane by using the speed of each vehicle located in each road.

8. The traffic management server of claim 1,
wherein the calculation unit calculates average speed information for each road based on the calculated vehicle speed information for each lane.

9. The traffic management server of claim 8,
wherein the calculation unit detects accident information for each lane by comparing the calculated average speed information and the calculated vehicle speed information for each lane.

10. A method for traffic management, comprising:
receiving radar detection results from radars attached to a plurality of vehicles;
detecting road boundary information from the received radar detection results;
detecting lane information, indicating which lane the plurality of vehicles is located in, based on the detected road boundary information and predetermined lane width information;
classifying the received radar detection results by using the detected lane information; and
calculating vehicle speed information for each lane by using the classified radar detection results.

11. The method for traffic management of claim 10,
wherein the radar detection results include at least one of radius information, angle information, and speed information of an object detected by signals transmitted from the radars.

12. The method for traffic management of claim 10,
wherein the road boundary information includes straight line value or curve line value corresponding to at least one of a median strip or a guardrail detected by the radars.

13. The method for traffic management of claim 10,
wherein the detecting of the lane information includes:
detecting horizontal distances from the detected road boundary information to each of the plurality of vehicles; and
comparing the lane width information with the horizontal distances to detect location information of each vehicle.

14. The method for traffic management of claim 10,
wherein the receiving of the radar detection results includes:
receiving location information of the vehicles mapped with the radar detection results, respectively.

15. The method for traffic management of claim 14,
wherein the classifying of the received radar detection results includes:
classifying the received radar detection results for each lane by using the location information of the vehicles and the vehicle speed information for each lane.

16. The method for traffic management of claim 10,
wherein the calculating of the vehicle speed information for each lane includes:
detecting a speed of each vehicle by using a radar detection result corresponding to a vehicle in front of each vehicle from among the radar detection results classified for each lane, and
calculating the vehicle speed information for each lane by using the speed of each vehicle located in each road.

17. The method for traffic management of claim 10,
wherein the calculating of the vehicle speed information for each lane includes:
calculating average speed information for each road based on the calculated vehicle speed information for each lane, and
detecting accident information for each lane by comparing the calculated average speed information and the calculated vehicle speed information for each lane.

18. A non-transitory computer readable medium storing computer program including a sequence of instructions for traffic management that, when executed by a computing device, causes the computing device to:
receive radar detection results from radars attached to a plurality of vehicles;
detect road boundary information from the received radar detection results;
detect lane information, indicating which lane the plurality of vehicles is located in, based on the detected road boundary information and predetermined lane width information;
classify the received radar detection results by using the detected lane information; and
calculate vehicle speed information for each lane by using the classified radar detection results.

* * * * *